Aug. 29, 1950  I. HARRISON ET AL  2,520,682
METHOD AND MOLD FOR MAKING CANDLES
Filed May 28, 1948

INVENTORS:
Irl Harrison
Brice C. Voight

BY Arthur H Bransky
ATTORNEY

Patented Aug. 29, 1950

2,520,682

UNITED STATES PATENT OFFICE 2,520,682

METHOD AND MOLD FOR MAKING CANDLES

Irl Harrison and Brice C. Voight, Whiting, Ind., assignors to Standard Oil Company, Chicago, Ill., a corporation of Indiana Application May 28, 1948, Serial No. 29,914

4 Claims. (Cl. 18—39)

This invention relates to an improved method and mold for making candles and more particularly relates to an improved method and mold for making so-called pinnacle candles.

Heretofore, in making certain types of relatively large candles, for example in the preparation of the so-called large pinnacle candles, it has been the practice to employ a mold of the desired shape having coaxially centered in the mold a wick rod or pin extending through the entire length of the mold and removable therefrom. Molten wax is poured into the mold and permitted to solidify therein. When the wax is sufficiently hard, to avoid closure of the channel formed by the wick rod, the candle, with the wick pin still in the wax body, is withdrawn from the mold and wicked by removing the wick pin and inserting the wick in the channel left by the wick pin and pulling the wick through as the wick pin is withdrawn from the wax body.

Figure 2:
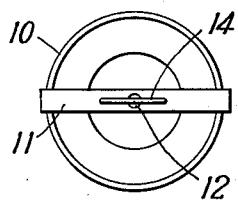
Figure 1:
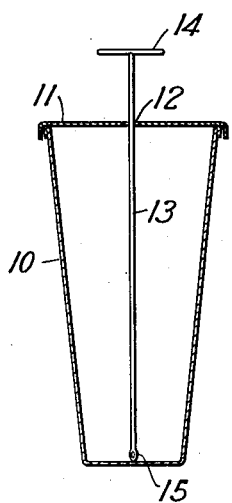

The prior method of molding candles as above described is illustrated by referring to Figures 1 and 2 of the accompanying drawing, in which Figure 1 is a vertical section of the candle molds used heretofore and Figure 2 is a plan view thereof. The mold consists of a shell 10, of the desired shape and size, a centering strip 11 fitted over the top thereof and provided with an opening 12 through which the removable wick pin 13 is inserted. The wick pin 13 is of greater length than the shell 10 and is provided at the exposed end with a means 14 for withdrawing the rod from the molded candle. If desired, the opposite end of the wick pin 13 can be provided with an eye 15, through which the wick may be inserted so that as the pin 13 is withdrawn from the candle body the wick will be drawn through the channel formed by the wick pin 13. In making the candle, the shell 10 is filled with molten wax; when the wax has set sufficiently hard, to avoid closure of the channel formed therein by wick pin 13, the solidified candle body containing wick pin 13 is withdrawn from the shell 10. The pin 13 is then forced through the end of the candle body, a wick inserted in the eye 15 and the candle wicked by withdrawing the rod 13 from the solidified candle body.

In preparing candles by this method, it has been necessary to remove by sawing or other means, from one to three, or more inches from the butt of the candles in order to obtain a plane surface base. This is both wasteful and time-consuming.

It is an object of the present invention to provide a candle mold which will facilitate the molding of candles with a finished plane surface. Another object of the invention is to provide a candle mold which will make possible the molding of candles by a more economical and rapid method. Other objects and advantages will become apparent from the following description thereof.

In accordance with the present invention we have provided a candle mold with an insert or facing plate which permits the molding of the candle with a plane surface base. The mold is also provided with a wick pin which is secured by welding or other suitable means to the center of the top or small end of the mold and forms a permanent part of the mold, thus eliminating any possibility of the wick pin being off center.

Figure 4:
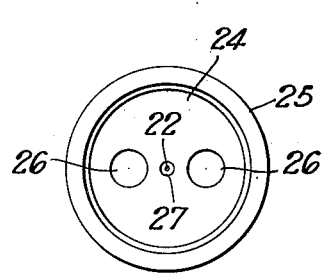
Figure 3:
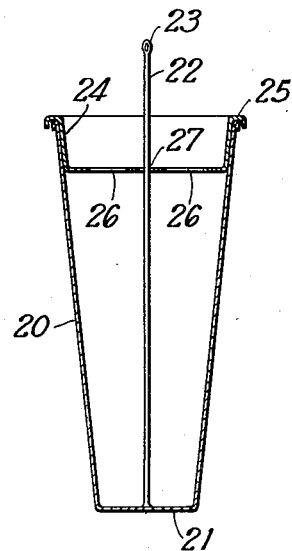

A vertical section and a plan view of our improved candle mold is illustrated by Figures 3 and 4, respectively of the accompanying drawing.

Referring to Figures 3 and 4, our improved candle mold comprises a shell 20 of any desired shape or form, but for the purpose of illustration is shown in the form of a truncated cone having a closed end 21, which forms the top of the candle. A wick pin 22 is coaxially located in the shell 20 and secured to the end 21 by welding or other suitable means. The wick pin 22 is provided with an eye 23 or other suitable wick-fastening means, to facilitate wicking the candles as hereinafter described. Fitted into the open end of the shell 20 (which forms the base of the molded base of the molded candle) is an insert or facing plate 24 provided with prongs or a rim 25 which fits over the open end of the shell 20 for holding the insert in place at the desired depth in the shell. The insert 24 is provided with a plurality of openings 26 through which the molten wax is poured into the shell 20 and an opening 27 for receiving the wick pin 22. The insert 24 can be of any suitable material, such as metal or heat-resistant plastic, and is of the same shape and of substantially the same inside area of the portion of shell 20 into which it is fitted.

In molding candles the insert 24 is placed in the shell 20 usually to within about ⅛" of the final candle length and molten wax poured into the shell through openings 26 of the insert 24. Sufficient wax is poured into the shell 20 to completely fill the shell and cover insert 24. When the wax is solidified, a wick is inserted in the eye 23 of the wick pin 22 and candle body together with the insert 24, is removed from the shell 20 so that by passing the candle over the wick pin 22 the candle is wicked as it is being pulled out of the shell 20. When the candle is withdrawn from the shell 20 and passed over the eye 23, the wick is severed at the desired length. The insert 24 is then removed by applying a slight blow thereto leaving a uniform plane surface at the base of the candle.

By using candle molds for the present invention it is possible to combine in one operation the wicking and removing of the candles from the mold. By employing the described inserts the candle as it is being removed from the mold is provided with a level plane surface base, eliminating the necessity of removing, by sawing or other suitable means, the butt end of the molded candle, thereby eliminating a time-consuming operation.

We claim:

1. A candle mold comprising a shell having an open end and a closed end, a pin, of greater length than said shell, coaxially located in said shell and rigidly secured to the closed end of said shell, and a facing plate provided with a plurality of openings fitted in the open end of said shell.

2. A candle mold comprising a shell closed at one end, a pin, of greater length than said shell, coaxially located in said shell and rigidly secured to the closed end thereof, and a facing plate, of substantially the same shape and inside area of the upper portion of said shell, fitted into the open end of said shell and suspended therefrom, said facing plate being provided with a plurality of openings.

3. A candle mold comprising a shell having an open end and a closed end, a pin, of greater length than said shell, coaxially located in said shell and rigidly secured to the closed end of said shell, and having a wick-securing means at the free end thereof, and a facing plate, of substantially the same shape and size as the inside of the upper portion of said shell, suspended from the wall of said shell, said facing plate being provided with a plurality of openings for introducing molten wax into said shell and a center opening through which said pin extends.

4. The method of molding candles comprising providing a mold comprising a shell having a closed bottom, a pin, of greater length than said shell, coaxially located in said shell and rigidly secured to the closed end thereof, and having a wick-securing means at the free end thereof, and a facing plate, of substantially the same shape and size as the inside of the upper portion of said shell, suspended from the walls thereof, said facing plate being provided with a plurality of openings for introducing molten wax into said shell and a center opening through which said pin extends, introducing sufficient molten wax into said shell through the openings of said facing plate, to fill said shell and cover said facing plate, permitting the molten wax to solidify in said shell, securing a wick to the wick-securing means of said pin, withdrawing the said solidified wax body together with said facing plate, from said shell by passing said wax body over said pin, severing said wick and removing the same from the wick-securing means on said pin, and removing said facing plate from the solidified wax body.

IRL HARRISON.
BRICE C. VOIGHT.

REFERENCES CITED

The following references are of record in the file of this patent:

UNITED STATES PATENTS

| Number | Name | Date |
|---|---|---|
| 345,272 | Brown | July 13, 1886 |
| Re. 20,854 | Deckert | Sept. 13, 1938 |